(12) United States Patent
Song et al.

(10) Patent No.: US 6,266,311 B1
(45) Date of Patent: Jul. 24, 2001

(54) OPTICAL DISK PLAYER

(75) Inventors: Geun-Hyuk Song; Kye-Yeon Ryu, both of Pyungtaek; Ick-Joo Cha, Suwon, all of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/164,321

(22) Filed: Oct. 1, 1998

(30) Foreign Application Priority Data

Oct. 9, 1997 (KR) ................................................ 97-51889
May 26, 1998 (KR) ................................................ 98-18997
Jul. 28, 1998 (KR) ................................................ 98-30268

(51) Int. Cl.[7] .................................................. G11B 17/04
(52) U.S. Cl. .......................................... 369/77.1; 369/223
(58) Field of Search ................................. 369/75.2, 77.1, 369/77.2, 215, 219, 223; 360/99.02, 99.03, 99.06, 99.07, 267.3, 267.4

(56) References Cited

U.S. PATENT DOCUMENTS

| | | | |
|---|---|---|---|
| 4,679,182 | * 7/1987 | Kamoshita et al. | 369/77.2 |
| 4,701,901 | * 10/1987 | Imai | 369/75.2 |
| 5,119,357 | * 6/1992 | Tsuruta et al. | 369/75.2 |
| 5,251,195 | * 10/1993 | Kawakami et al. | 369/75.2 |
| 5,414,578 | * 5/1995 | Lian et al. | 360/106 |
| 5,473,593 | * 12/1995 | Wheeler | 369/77.1 |
| 5,500,844 | * 3/1996 | Kim et al. | 369/77.2 |
| 5,608,706 | * 3/1997 | Park | 369/77.2 |
| 5,633,850 | * 5/1997 | Park | 369/77.1 |

FOREIGN PATENT DOCUMENTS

| | | |
|---|---|---|
| 62-183081 | * 8/1987 | (JP) . |
| 62-271245 | * 11/1987 | (JP) . |
| 1-98160 | * 4/1989 | (JP) . |
| 2236860 | 9/1990 | (JP) . |
| 5505558 | 3/1993 | (JP) . |
| 9-161421 | * 6/1997 | (JP) . |

* cited by examiner

*Primary Examiner*—David L. Ometz
(74) *Attorney, Agent, or Firm*—Birch, Stewart, Kolasch & Birch, LLP

(57) ABSTRACT

An optical disk player simplifies the mechanism of an emergency ejecting device for manually ejecting a tray, and includes a pickup unit which ejects the tray by virtue of the driving power of a pickup motor in a read-in area, without separately using an ejecting driving motor. The optical disk player is provided with a tray ejecting device for ejecting the tray on which a disk is placed by which the feeding power of the pickup motor for driving the pickup unit is converted to the ejecting power when the pickup unit is in the read-in area, and an emergency tray ejecting device for manually ejecting the tray.

22 Claims, 11 Drawing Sheets

OPTICAL DISK PLAYER

BACKGROUND OF THE INVENTION

1. Field of the Invention

The present invention relates to an optical disk player, and more particularly to an optical disk player wherein a pickup unit ejects a tray by virtue of a driving power of a pickup motor in a read-in area without using a separate motor for ejecting, and which simplifies a mechanism of an emergency device for manually ejecting the tray, in the event of an optical disk player malfunction.

2. Description of the Conventional Art

Generally, an optical disk player is a device for playing or recording an optical disk, such as a digital video disk (DVD) or a compact disk (CD), and is largely divided into two types, one is a tray loading type in which a tray on which an optical disk is placed moves in front and rear for thereby loading/unloading the disk, and the other is a slot loading type which is inserted into a slot provided in an optical disk player for loading/unloading a disk.

Hereinafter, the tray-loading-type optical disk player will be described, being taken as an example of a conventional optical disk player.

FIG. 1 illustrates major elements in the conventional optical disk player.

As shown therein, the conventional optical disk player is provided with a frame 1a, a main base 1b which is disposed so as to be ejected/injected from/to the frame 1a, a spindle motor 2 disposed on the main base 1b for playing or recording a disk, a pick up unit 4 for reading data on the disk while moving forward and backward along a guide shaft 3 and a lead screw 3' which is provided on the main base 1b, a driving motor 5 for driving the pick up unit 4, a tray (not shown) formed on a back side of the main base 1b for safely placing the disk, and an ejecting means for ejecting/injecting the tray.

More specifically, the ejecting means includes an ejection knob 6 disposed in a front area of the player, an ejection motor 7 which is driven by the ejection motor 7, a switch 8 which controls the operation of the ejection motor 7, a cam gear 9 which rotates by being engaged with the ejection motor 7, a stopper lever 10 which operates in accordance the cam gear 9, an elastic member 11 which elastically supports the tray to be ejected when the tray is released from the stopper lever 10, and an emergency lever 12 disposed at one side of the ejection knob 6.

Now, the ejecting operation of the thusly provided disk player will be described as follows.

First, when a user presses the ejection knob 6, the ejection motor 7 rotates and therefore the cam gear 9 rotates in accordance with the ejection motor 7.

Next, by virtue of the rotation of the cam gear 9, the stopper lever 10 which fixes the tray releases the tray, thus the tray is ejected by the elasticity of the elastic member 11 which supports the tray, and then the stopper lever 10 returns to the original location.

At this time, the switch 8 senses the rotation of the cam gear 9 to suspend the ejection motor 7.

While, in case of which the disk player suddenly malfunctions, an emergency ejecting means for manually ejecting the tray is provided at a portion of the main base 1b.

As shown in FIG. 2, the emergency ejecting means is provided with a hole (not shown) provided in the front side of the main base 1b, the emergency lever 12 disposed on the main base 1b to correspond with the hole, the stopper lever 10 which moves forward and backward around a pivot 10b by virtue of the emergency lever 12, a hook unit 10a provided at a portion of the stopper lever 10 and a fixing protrusion 1c being protruded from the main base 1b to fasten the hook unit 10a.

Now, the operation of the above emergency ejecting means will be described with reference with the accompanying drawings.

First, when the user inserts an interposition, such as a wire or a pin, into the hole formed in the main base 1b, the emergency lever 12 moves to the back side of the hole by the interposition, and the stopper lever 10, provided at a bottom part of a part of the emergency lever 12, turns around the pivot 10b.

Here, in accordance with the movement of the stopper lever 10, the hook unit 10a of the stopper lever 10 is released from the fixing protrusion unit 1c of the main base unit 1b, and the tray is ejected by the elastic member 11 which elastically supports the tray.

However, the conventional optical disk player has a problem in that the elements, such as the spindle motor for rotating the disk, the driving motor for driving the pickup unit, the ejection motor for driving the tray, the switch and the cam gear, etc., are independently provided, thus increasing the manufacturing cost and the number of the motor, and accordingly increasing the size of the disk player.

Therefore, in order to overcome the foregoing problems, according to Japan Utility model No. 50558, 1993, there has been introduced a method of ejecting a tray without using an ejection motor.

FIGS. 3 and 4 illustrate a tray ejecting unit portion in accordance with Japan Utility model No. 50558, 1993.

As shown therein, the tray ejecting unit is provided with a driving motor 13, a driving gear 14 connected with the driving motor 13, an intermediate gear 16 engagedly connected with the driving gear 14 by a link 15, a loading gear 17 which engages with the intermediate gear 16 which turns clockwise, a lock arm 18 which maintains the engagement of the intermediate gear 16 and the loading gear 17, a spring 19 elastically connected to one side of the lock arm 18, a rack gear 20 engaging with the loading gear 17, a thrust plate 21 for loading/unloading a disk by moving forward and backward by virtue of the rack gear 20, and a releasing portion 22 for releasing the engagement of the intermediate gear 16 and the loading gear 17.

Next, the ejecting operation of the thrust plate 21 of the conventional optical disk player will be described.

First, when rotating the driving motor 13 in opposition to the direction of the disk rotation in the disk loading operation, the intermediate gear 16 is engaged with the loading gear 17 and the engagement of the two gears 16, 17 is maintained by the lock arm 18.

Through the rack gear 20, being engaged with the loading gear 17, and a rack 21a of the thrust plate 21, engaged with the rack gear 20, the thrust plate 21 is driven, to thereby eject the disk.

While, after the intermediate gear 16 is released from the lock arm 18, when rotating the driving motor 13, the link 15 starts to rotate anticlockwise and thus the intermediate gear 16 is separated from the loading gear 17 to thereby play the disk.

However, although the above-described system may have the advantage of ejecting the disk only by virtue of the driving motor, without using the exclusive ejecting motor, when the disk player malfunctions, or when a power failure occurs, the thrust plate on which the disk is placed cannot be ejected.

In order to solve the foregoing problem, there also has been introduced a method for manually ejecting a tray in case where a disk player malfunctions, as well as ejecting the tray without using the ejecting motor, as recorded in Japan Patent No. 236860, 1990.

In accordance with FIGS. 5 and 6, the structure of the ejecting portion of the optical disk player, published in Japan Patent No. 236860, 1990, will be described.

As shown therein, under a frame 23 there are fixedly provided a motor 24, a worm gear 25, a worm wheel 26, an intermediate gear 27, a lever 28, a pinion 29, a rack plate 30, a cam 31, a first spring 32, a second spring 33 and a plate 35 with a longitudinal plate member 34 placed thereon.

The structure of the member placed on the plate 35 will be described as follows.

The motor 24 which provides the driving power to eject the disk is fixed and the worm gear 25 is coupled to a pivot thereof and engaged with the worm wheel 26.

Further, the worm wheel 26 is engaged with the intermediate gear 27 to which the lever 28 is coupled, the intermediate gear 27 is engaged with the pinion 29 and also the pinion 29 is engaged with the rack plate 30.

Additionally, there is provided the cam 31 of which an outer diameter portion 31a comes in contact with an end portion of the lever 28 which is coupled with the gear 27, when the intermediate gear 27 rotates anticlockwise.

Also, the provided longitudinal plate 34 moves by virtue of the elasticity of the second spring 33, due to the movement of the cam 31.

In the conventional optical disk player with the thusly structured ejecting unit, as shown in FIG. 7, the manual ejecting operation can be achieved by thrustingly inserting a driver or drill into a hole 37 which is provided in a front panel 36, moving the rack plate 30 to the forward direction and manually ejecting a tray (not shown), to thereby take a disk out of the player.

However, the above ejecting unit also has a problem in that, due to noises and overload according to heat generation of the gear, the moving speed of the tray cannot be uniform.

SUMMARY OF THE INVENTION

Accordingly, the present invention is directed to an optical disk player which overcomes the foregoing and other problems.

An object of the present invention is to provide an optical disk player in which the mechanism of an emergency ejecting device for manually ejecting a tray is simplified, and of which a pickup unit ejects the tray by virtue of the driving power of a pickup motor in a read-in area, without separately using an ejection driving motor.

To achieve these and other advantages and in accordance with the purpose of the present invention, as embodied and broadly described, an optical disk player is provided with a tray ejecting device for ejecting a tray on which a disk is placed by which the feeding power of a pickup motor for driving a pickup unit is converted to the ejecting power when the pickup unit is in the read-in area, and a device for manually ejecting the tray.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

First, an optical disk player according to a first embodiment of the present invention will be described.

Figure 1:
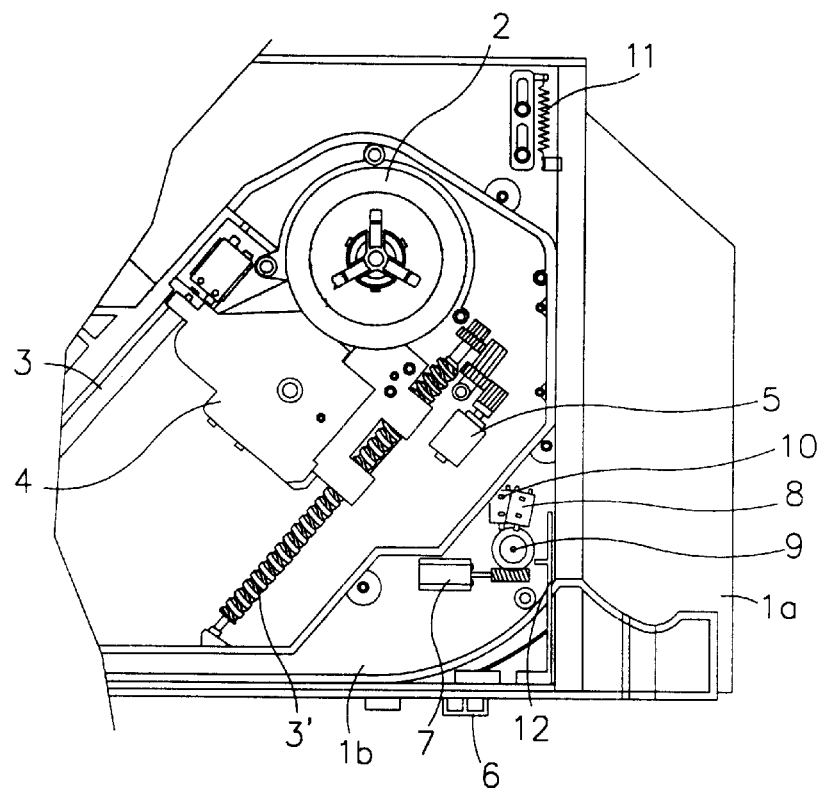
FIG. 1 is a plane diagram partially illustrating an ejecting unit of a conventional optical disk player.
Figure 2:
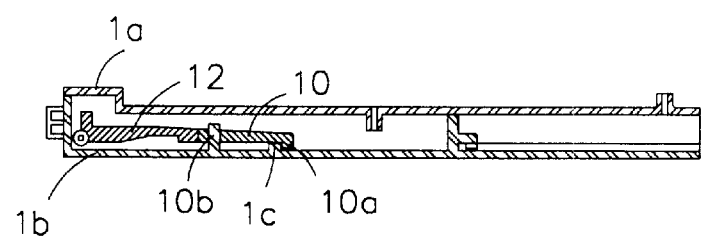
FIG. 2 is a side cross-sectional diagram of an emergency tray ejecting device of the conventional disk player.
Figure 3:
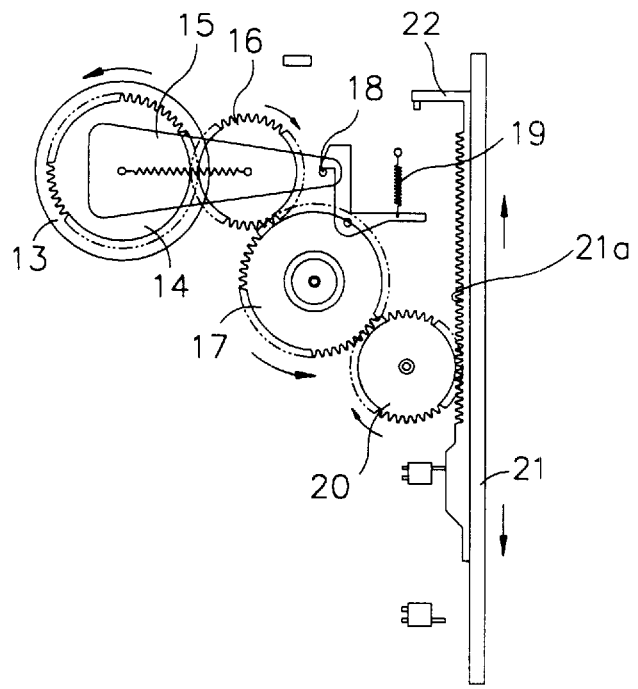
FIG. 3 is a plane diagram illustrating an ejecting unit portion of another conventional optical disk player which does not apply an exclusive loading motor in case of ejecting a tray.
Figure 4:
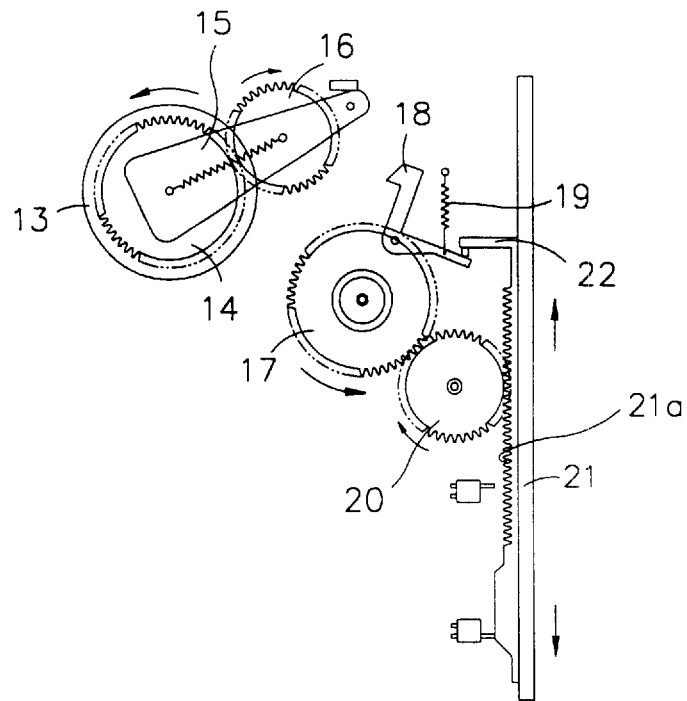
FIG. 4 is a plane diagram illustrating an ejecting unit portion in FIG. 3 in case of playing a disk.
Figure 5:
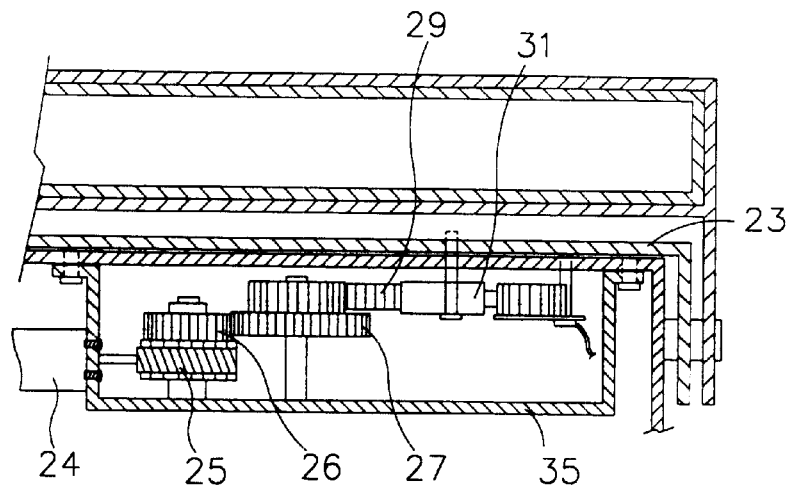
FIG. 5 is a cross-sectional diagram illustrating an ejecting unit portion of the other conventional optical disk player.
Figure 6:
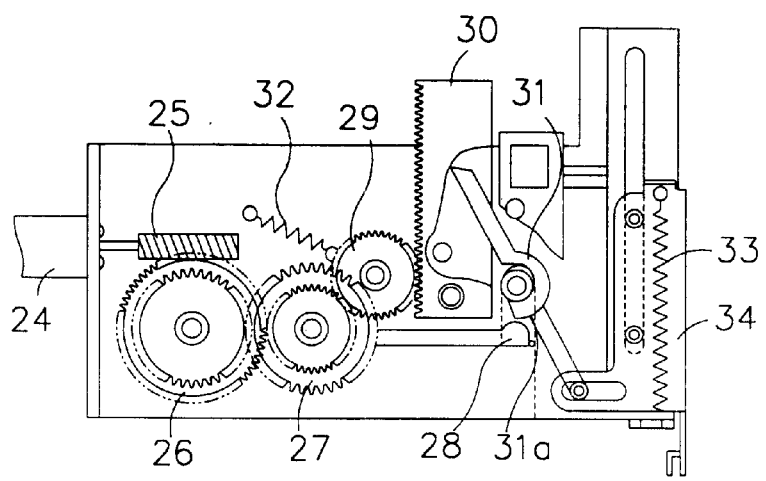
FIG. 6 is a plane cross-sectional diagram.
Figure 7:
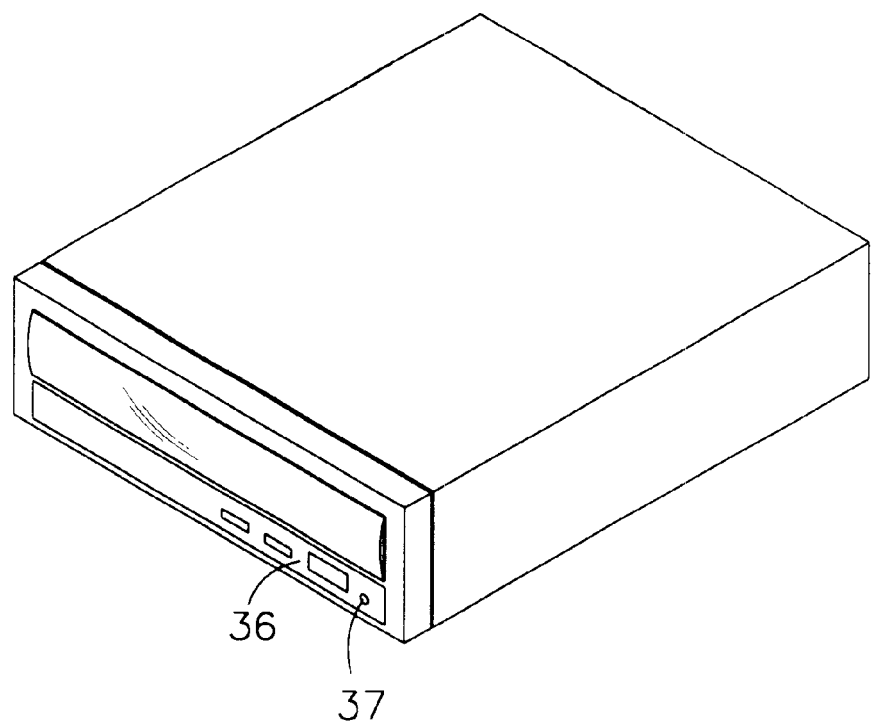
FIG. 7 is a perspective view illustrating the other conventional optical disk player.
Figure 8A:
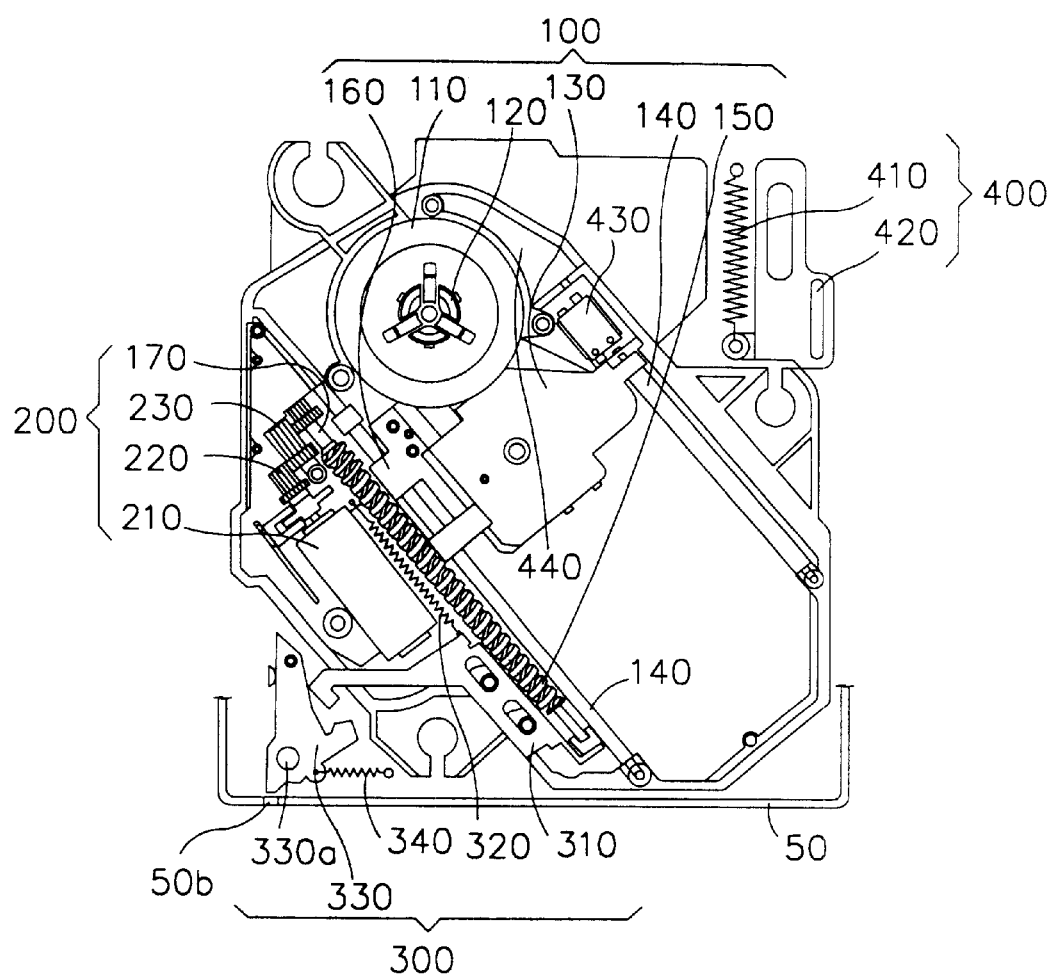
FIG. 8A is a plane diagram illustrating an optical disk player according to an embodiment of the present invention, wherein a tray is not ejected.
Figure 8B:
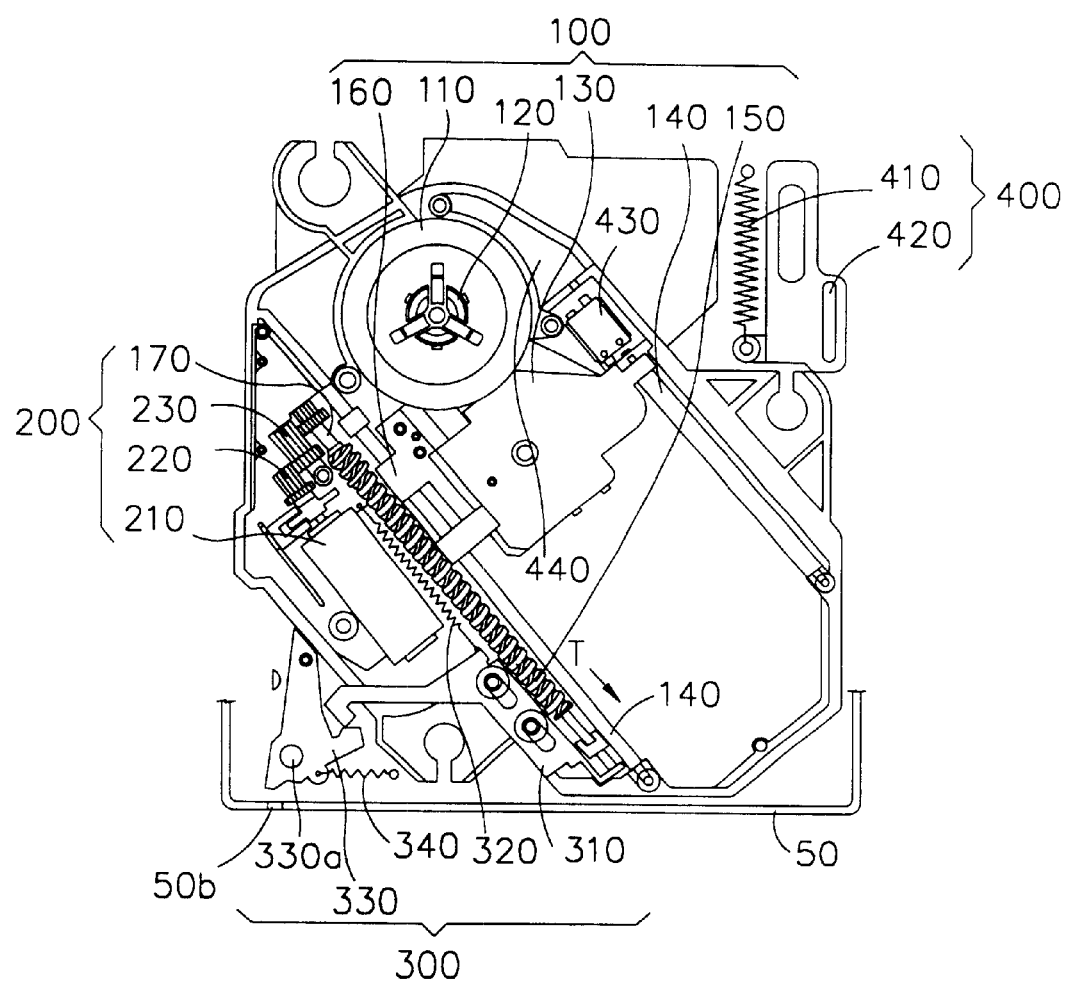
FIG. 8B is plane diagram illustrating an optical disk player in FIG. 8A, wherein the tray has been ejected.

FIG. 8A illustrates a condition before a tray of the optical disk player is ejected, and FIG. 8B is a condition wherein the tray thereof is being ejected.

As shown therein, a main base 50 of the optical disk player is provided with a playing means 100, a power generating means 200, a tray ejecting means 300 and an elastic means 400.

More specifically, the playing means 100 is comprised of a spindle motor (not shown) for driving a disk, a turn table 110 disposed on the spindle motor, a clamp 120 for fixedly placing the disk on the turn table 110, a pickup unit 130 for recording data in the disk, a lead screw 150 for moving the pickup unit 130 forward and backward along a guide shaft 140 and a feed guide 160, being engaged with the lead screw 150, disposed at one side of the pickup unit 130 for moving the pickup unit 130 forward and backward.

Next, the power generating means 200 for driving the lead screw 150 is provided with a driving motor 210 provided at one side of the lead screw 150, a gear 220 disposed at an end portion of the driving motor 210 and an idle gear 230 engaged with the gear 220, wherein the lead screw 150 is driven by the driving motor 210 by which the idle gear 230 is engaged with a gear 170 disposed at an end portion of the lead screw 150.

Further, the tray ejecting means 300 includes an ejecting lever 310 which operates in accordance with the rectilinear movement of the lead screw 150 driven by the power generating means 200, a first spring 320 which is elastically connected to an end portion of the ejecting lever 310, a stopper lever 330 which moves around a pivot 330a by virtue of the ejecting lever 310 and a second spring 340 elastically connected with one side of the stopper lever 330.

In addition, the elastic means 400 is provided with a third spring 410 and a movable lever 420 of which an end portion is connected with the third spring 410 and the other end portion is supported by a protruding portion (not shown) to thereby promptly eject the tray.

Here, it is noted that the elastic means is disposed diagonally with the stopper lever 330.

Figure 9:
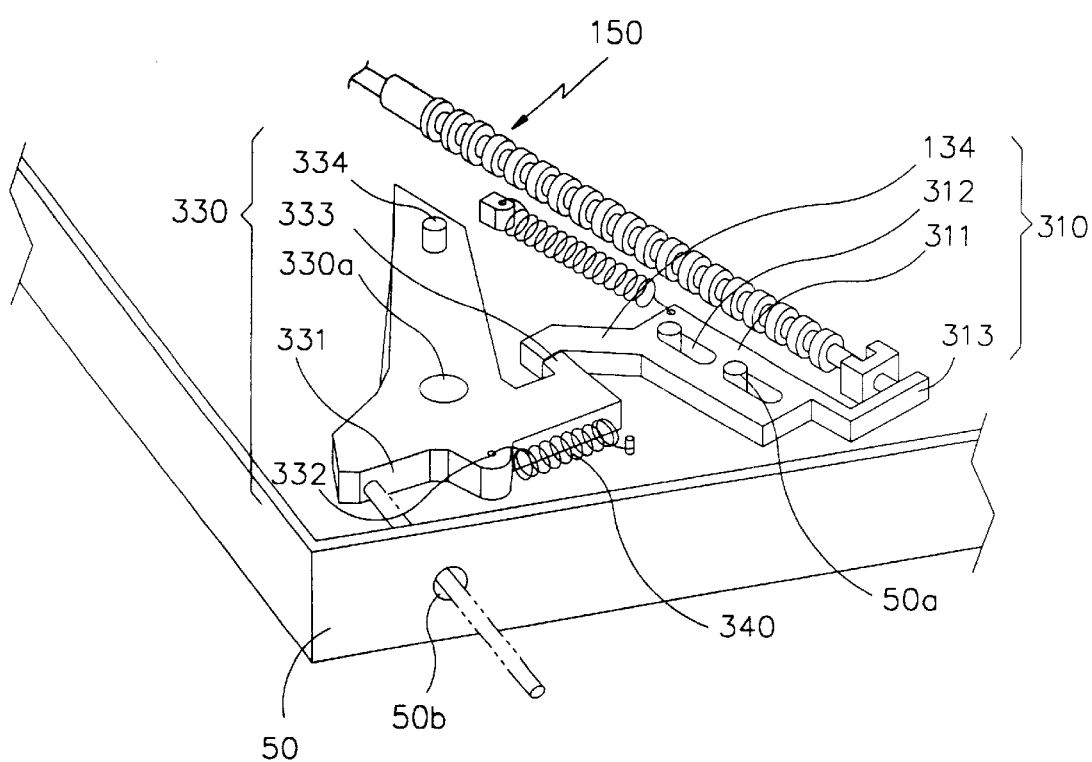
FIG. 9 is a plane diagram illustrating a tray ejecting means of an optical disk player according to an embodiment of the present invention.

Now, with reference to FIG. 9, the structure of the stopper lever 330 and the ejecting lever 310, the constituents of the tray ejecting means 300, will be described in more detail.

First, in the ejecting lever 310, there are provided a main body 311 in which a couple of guide slots 312 for guiding the movement of the ejecting lever 310 are formed, a portion 313 which is formed at an end portion of the main body 311 in a shape of "$L$" and an arm 314 which is formed at the other end portion of the main body 311 and operates the stopper lever 330.

Particularly, the portion 313 of the ejecting lever 310 is disposed at an end portion of the lead screw 150 of the playing means 100 and the guide slots 312 respectively receive a guide protrusion 50a and thus, in the event of ejecting the disk, is engagedly operated with the relative movement of the lead screw 150 which is generated by the movement of the pickup unit 130 towards the clamp 120.

Meanwhile, in the stopper lever 330, there is provided a contact portion 331 which is in contact with a pin or a thin wire, in order to pivot about a pivot 330a in accordance with the pin or thin wire passing through a hole 50b formed in a portion of a main base 50, and a portion 332 is provided at a side of the contact portion 331 to be connected to the second spring 340, and at a side of the portion 332 a protruding portion 333 is formed to be engagedly in contact with the arm 314 of the ejecting lever 310.

Additionally, it is noted that a stopper pin 334 is provided on a portion of the stopper lever 330.

Figure 10:
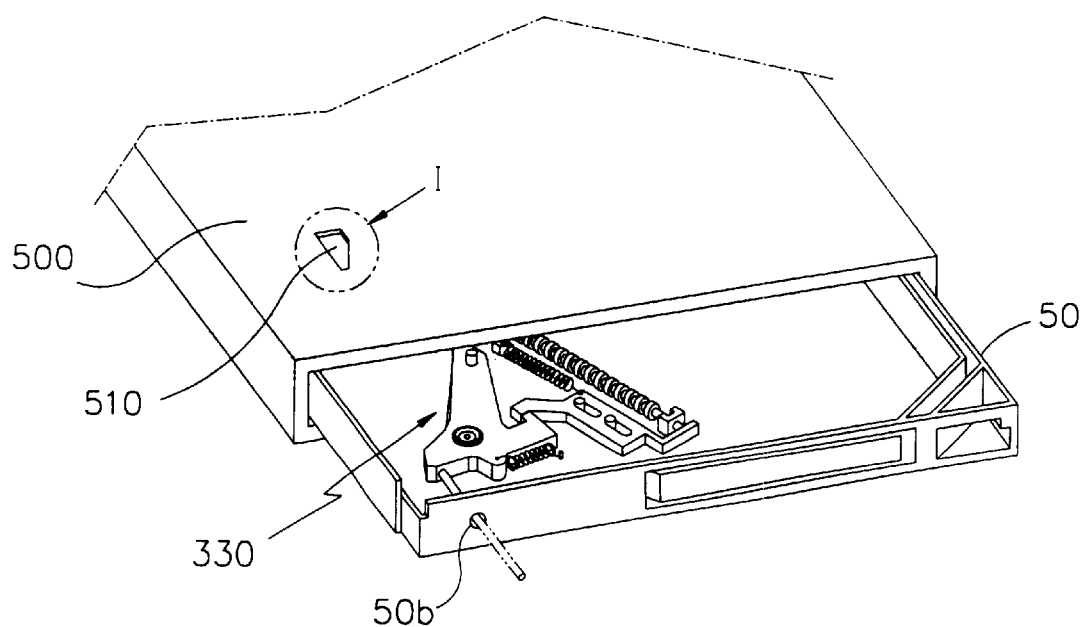
FIG. 10 is a perspective view illustrating which a tray is being ejected according to an embodiment of the present invention.
Figure 11:
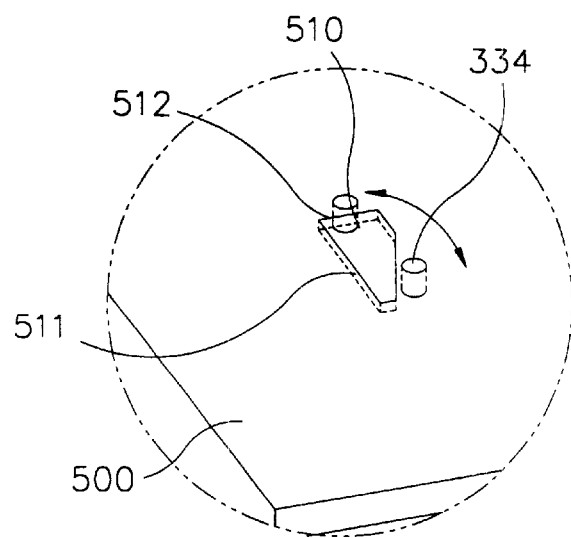
FIG. 11 is a diagram enlargingly illustrating a portion 'I' in FIG. 10.

Here, as shown in FIGS. 10 and 11, the stopper pin 334 restrains the tray from moving further, by being controlled by a fixing means composed of a protrusion 510 which is downwardly protruded from a top portion of a frame 500. The protrusion 510 has an arc surface 511 and plane surfaces 512.

That is, when loading the disk, the stopper pin 334 slidingly moves along the arc surface 511 and is finally caught at one of the plane surfaces 512, to thereby fix the tray.

Now, the structure of the lead screw 150 of the playing means 100 will be described with reference to FIGS. 12 and 13A–13B.

Figure 12:
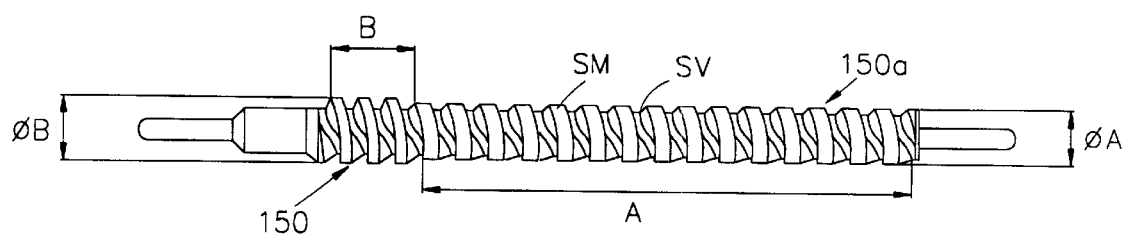
FIG. 12 is a plane diagram illustrating a lead screw provided in an optical disk player according to an embodiment of the present invention.
Figure 13A:
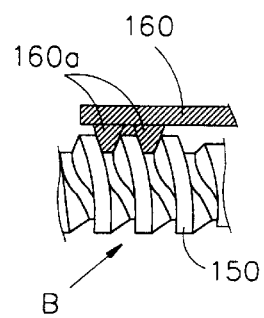
FIG. 13A is a plane diagram illustrating which a lead screw is being engaged with a feed guide during a disk ejecting operation.
Figure 13B:
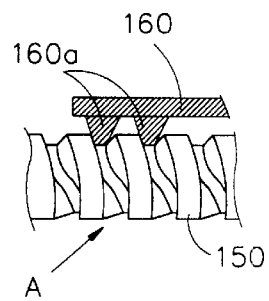
FIG. 13B is a plane diagram illustrating which a lead screw is being engaged with a feed guide during a disk playing operation.

The lead screw 150, as shown in FIG. 12, is divided into an operation section A by which the pickup unit B is operated and an ejection section B by which the tray is ejected, and here it is noted that a diameter φB of the ejection section B is larger than a diameter φA of the operation section A.

Specifically, the operation section A is a section in which the feed guide 160 is engaged with the lead screw 150 when the pickup unit 130 moves along the guide shaft 140, while the eject section B is a section where, when ejecting the disk, the feed guide 160 of the pickup unit 130 is engaged with the lead screw 150.

In the lead screw 150 it is noted that an end portion of the operation section A, which corresponds to the ejection section B can substantially have a large diameter, so as to keep racks 160a of the feed guide 160 from being broken away, due to the sudden playing operation of the pickup unit 130.

In addition, 430 and 440 in FIG. 8 denote a limit switch for sensing the movement of the pickup unit 130 and a pickup base, respectively, while SM and SV in FIG. 12 denote a screw mountain and a screw valley, respectively.

Now, with reference to the accompanying drawings, the operation of the optical disk player according to the embodiment of the present invention will be described.

When the disk is placed on the tray (not shown) and fixed on the turn table 110 by the clamp 120, the stopper lever 330 turns counterclockwise by virtue of the elasticity of the second spring 340. Here, the stopper pin 334 provided on the stopper lever 330 moves along the arc surface 511 of the protrusion 510 which is provided downwardly protruding from the top portion of the frame 500, and is finally caught at the plane surface 512, to thereby keep the tray from ejecting.

Here, it is noted that the tray is elastically supported by the elastic means 400.

Further, the spindle motor (not shown) rotates and accordingly the turn table 110 rotates in accordance with the disk, and simultaneously the driving power of the driving motor 210 is conveyed over the gears 220, 230, 170, thereby rotating the lead screw 150.

When the lead screw 150 starts to rotate, a screw portion 150a thereof is engaged with the racks 160a of the feed guide 160 and the pickup unit 130 reads (or records) the signal on the disk while moving along the guided shaft 140.

When the pickup unit 130 reads (or records) the signal recorded on the disk, the feed guide 160 moves, being engaged with the portion of the operation section A of the lead screw 150.

The ejection operation for ejecting the disk will be described as follows.

First, when the ejection operation command is received, the pickup unit 130 moves towards the side of the turntable 110, and at this time the screw portion 150a of the lead screw 150 is engaged with the racks 160a of the feed guide 160, and the pickup unit 130 accordingly moves.

As described above, although the movement of the pickup unit 130 is continually performed and sensed by the limit switch 700, the driving motor 210 is driven without stopping, for thereby moving the pickup unit 130, if the ejection operation command is given.

The thusly continually moving pickup unit 130 is suspended by the pickup base 440 and accordingly located in the read-in area. That is, the pickup unit 130 becomes located in an initial place for playing the disk by moving along the lead screw 150.

The movement of the pickup unit 130 is suspended, the driving motor 210 continues to rotate, the feed guide 160 enters to the ejection section B of the lead screw 150 and thus the lead screw 150 moves in the direction of 'T'.

Accordingly, the portion 313 of the ejecting lever 310 is moved in accordance with the movement of the end portion of the lead screw 150, and here the ejecting lever 310 also moves in the direction of 'T'.

When the ejecting lever 310 moves, the guide protrusions 50a which are initially located at corresponding end portions of the guide slots 312 of the ejecting lever 310 move to the other end portion thereof. Accordingly the arm 314 comes in contact with the driving protrusion 333 of the stopper lever 330 for thereby turning the stopper lever 330 clockwise.

Due to the turning of the stopper lever 330, the stopper pin 334 thereof is detached from the plane surface 512 of the protrusion 510 protruded from the frame 500, and the tray is ejected from the player for a predetermined distance by the elasticity of the elastic means 400.

In other words, in the tray ejecting operation according to the embodiment of the present invention, when the pickup unit 130 is deterred from moving in the read-in area, namely when the movement of the pickup unit 130 is suspended in the initial location for playing the disk while moving along the lead screw 150, the disk is ejected by virtue of the moving power of the lead screw 150 with respect to the pickup unit 130 due to which the playing power of the pickup motor 210 is changed to the ejecting power.

The completion of the ejection operation is sensed by a separately provided switch (not shown), accordingly the driving motor 210 rotates in opposition to the previous direction of the rotation and thus the feed guide 160 is removed from the ejection section B of the lead screw 150.

Meanwhile, since the ejection section B has a diameter larger than that of the operation section A, when the movement of the pickup unit 130 is suspended and the lead screw 150 moves in the direction of 'T', the racks 160a of the feed guide 160 do not move cross the corresponding screw mountains SM of the lead screw 150 and thus the movement of the lead screw 150 is secured.

Contrarily, when the diameter of the ejection section B is not larger than that of the operation section A, the racks 160a moves cross the corresponding screw mountains SM of the lead screw 150 or may be placed over the mountains, which results in inadequate ejection operation.

Therefore, by making a difference between the diameters of the sections A, B of the lead screw 150, the racks 160a can easily be restored from a breakaway condition during the pickup operation, also the lead screw 150 having a difference of the diameters of the sections thereof prevents the racks 160a from being broken away from the lead screw 150 and helps the tray to be accurately ejected without failure.

Further, when the optical disk player has a power failure or a tray ejecting trouble in the condition where the disk is inserted in the optical disk player, the manual tray ejecting operation will be described.

First, when inserting a pin into the hole 50b provided in the main base 50, the stopper lever 330 makes a turn for a certain degree around the pivot 330a and accordingly the stopper pin 334 which is caught at the plane surface 512 of the protrusion 510, being protruded from the frame 500, is removed therefrom, and the tray is ejected as a predetermined distance by the elastic means 400 provided in the main base 50.

Here, the stopper lever 330 returns to the original state by the force of restitution of the second spring 340. When the tray is forwardly ejected, the user manually holds the tray and takes out the disk.

Hereinafter, the optical disk player according to another embodiment of the present invention will be described with reference to the accompanying drawings.

Figure 14:
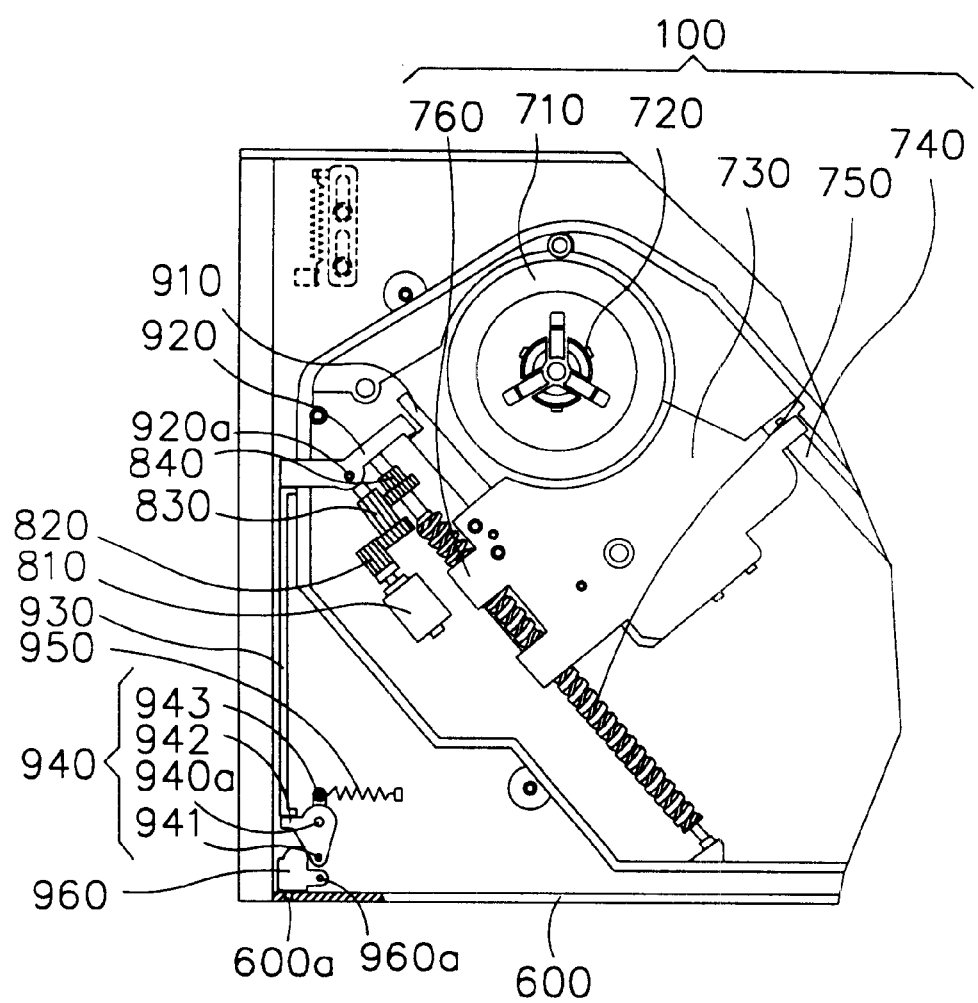
FIG. 14 is a plane diagram illustrating a tray ejecting device of an optical disk player according to another embodiment of the present invention.
Figure 15:
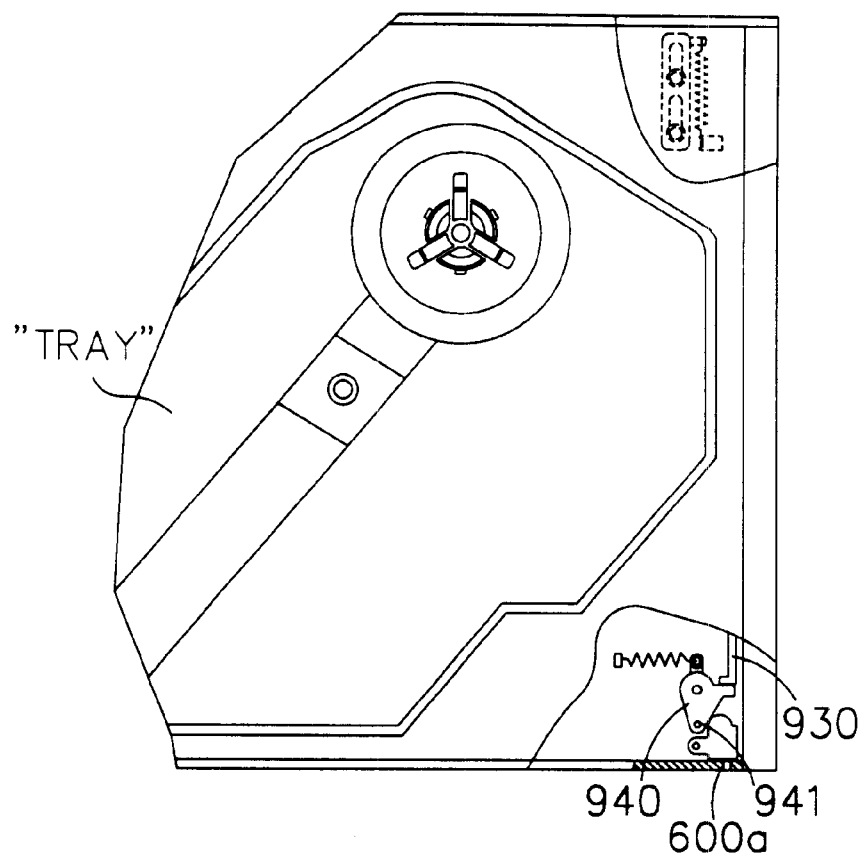
FIG. 15 is a rear-side diagram illustrating the tray ejecting device of the optical disk player according to the another embodiment of the present invention.

As shown in FIGS. 14 and 15, in a main base 600 there are provided a playing means 700, a power generating means 800 and a tray ejecting means 900, and a frame (not shown) includes an elastic means (shown in the dotted line) for elastically supporting the main base 600.

More specifically, the playing means 700 is provided with a spindle motor (not shown), a turn table 710 provided on the spindle motor part, a clamp 720 for securely holding a disk which is placed on the turn table 710, a pickup unit 730 for reading or recording information of the disk, a lead screw 750 for moving the pickup unit 730 along a guide shaft 740, and a feed guide 760 provided at one side of the pickup unit 730 to drive the pickup unit 730 by being engaged with the lead screw 750.

In the power generating means 800 for driving the lead screw 750, a driving motor 810 is provided at a side of the lead screw 750, a gear 820 installed at an end portion of the driving motor 810 and an idle gear 830 being engaged with the gear 820. Here, the idle gear 830 engages with a gear 840 provided at an end portion of the lead screw 750, and accordingly the lead screw 750 is rotated by virtue of the driving motor 810.

Finally, the tray ejecting means 900 is provided with an operation lever 910 provided at one side of an upper portion of the pickup unit 730, an operation arm 920 which rotates around a pivot 920a in accordance with the operation of the operation lever 910, a movable connecting lever 930 installed at one side of the main base 600 to be driven by the arm 920, a stopper lever 940 which rotates centering around a pivot 940a in accordance with the movement of the connecting lever 930, a first spring 950 elastically connected with one side portion of the stopper lever 940, and an emergency release lever 960 which locationally corresponds with an operation hole 600a of the main base 600 and is manually rotated centering around a pivot 960a to rotate the stopper lever 940.

Here, it is noted that the stopper lever 940 has the stopper pin 941 which has the same type as the previously described first embodiment according to the present invention, and a means (not shown) for fixing and releasing the tray by virtue of the stopper pin 941 is also composed of a protrusion in the same type of the first embodiment.

Additionally, at one side portion of the stopper lever 940 a protrusion 942 is provided in order that the stopper lever 940 may rotate in accordance with the operation of the connecting lever 930, also at an upper portion thereof a hooking portion 943 is provided to be connected with the first spring 950.

The elastic means is installed under the frame 501 in opposition to the stopper lever 940 and provided with a supporting lever (not shown) and a second spring (not shown) for elastically supporting the main base 600 to promptly eject the tray.

The operation of the above-described embodiment of the present invention will be omitted, since it is operated the same as the first embodiment thereof, except for which the pickup unit 730 moves forward and backward for playing/recording the information on the disk, one side of which moving along the lead screw 750 and the other side of which moving along the guide shaft 740.

Now, in the second embodiment of the invention, the ejecting operation for ejecting the disk will be described.

First, when received the ejecting operation, the pickup unit 730 moves toward the turntable 710 to be in the read-in area and continually moves to the turntable 710, resulting in which the operation lever 910 of the pickup unit 730 pushes the end portion of the operation arm 920 and thus the arm 920 turns anticlockwise centering around the pivot 920a.

Further, due to the movement of the operation arm 920, the connecting lever 930 is moved towards the operation hole 600a side by virtue of the other end portion of the arm 920, and the connecting lever 930 pushes the protrusion 942 of the stopper lever 940.

When pushing the protrusion portion 942 of the stopper lever 940, the stopper lever 940 turns anticlockwise around the pivot 960a, due to the movement of the stopper lever 940 the stopper pin 941 of the stopper lever 940, as described above, is removed from a plane surface (not shown) of a portion protruded from the frame 501, and the tray (not shown) is ejected from the player by the elastic means which elastically supports the tray.

In other words, in the tray ejecting operation according to the second embodiment the tray is ejected by the moving power of which the pickup unit 730 moves out of the read-in area, that is the initial location for playing the disk, due to which the power of the pickup motor 810 is converted to the tray ejecting power.

Additionally, when the optical disk player has a power failure or a tray ejecting trouble in the condition where the disk is inserted in the optical disk player, the manual tray ejecting operation will now be described.

First, when inserting a pin into the operation hole 600a provided in the main base 600, the stopper lever 960 turns centering around the pivot 960a, and the stopper pin 941, being caught at the plane surface of the protrusion downwardly protruded from the frame 501, is removed therefrom, and thus the tray is ejected by the elastic means which elastically supports the tray.

Here, it is noted that the stopper lever 960 returns to the original condition by virtue of the force of restitution the spring 943.

Next, when the tray is forwardly ejected, the user manually holds and pulls the tray, and takes out the disk placed on the tray.

As described above, by ejecting the tray by virtue of the power which drives the pickup unit, the optical disk player according to the present invention has effects to reduce the number of components of the player and to help the user to easily perform the manual tray ejection although there is some trouble with the optical disk player.

It will be apparent to those skilled in the art that various modifications and variations can be made in the optical disk player of the present invention without departing from the spirit or scope of the invention. Thus, it is intended that the present invention cover the modifications and variations of this invention provided they come within the scope of the appended claims and their equivalents.

What is claimed is:

1. An optical disk player which includes a pickup unit for recording/playing disk by moving along a lead screw which is driven by a pickup motor, comprising:

a disk ejecting device for ejecting the disk by which a pickup motor power is converted from a feeding power for driving the pickup unit to an ejecting power for moving the lead screw, when the pickup unit is suspended from moving in a read-in area of the disk during ejection.

2. The player according to claim 1, wherein the lead screw has at least two sections having differing outside diameters in accordance with corresponding operation sections of the pickup unit.

3. The player according to claim 2, wherein an ejecting section of the lead screw for ejecting the tray has a larger outside diameter than an outside diameter of a playing section for moving the pickup unit during playing of a disk.

4. The player according to claim 1, wherein the disk ejecting device ejects the disk by virtue of a moving power of the lead screw to a relative shaft direction by which the pickup motor power is converted to the ejecting power.

5. (Amended) The player according to claim 4, wherein the disk ejecting device comprises:

an ejecting lever which rectilinearly moves by engagement with the lead screw which is provided in a main base;

a first spring connected with a side portion of the ejecting lever for restoring the movement of the ejecting lever;

a stopper lever which moves about a pivot thereof by the movement of the ejecting lever;

a second spring elastically connected with a side portion of the stopper lever for restoring the movement of the stopper lever; and a fixing means for fixing/releasing a tray on which the disk is placed by the movement of the stopper lever.

6. The player according to claim 5, wherein in the ejecting lever, there are provided a main body including a plurality of guide slots for guiding the rectilinear movement of the ejecting lever, a portion formed at an end portion of the main body in a shape of "*L*", by which the moving power of the lead screw is delivered, and an arm formed at the other end portion of the main body to operate the stopper lever.

7. The player according to claim 5, wherein in the stopper lever there is provided a protrusion which comes in contact with an arm of the ejecting lever, thereby moving around a pivot thereof, a connecting portion to be connected with the second spring, a contact portion at a side portion of the connecting portion and a stopper pin provided on the stopper lever which is fixed/released by the fixing means.

8. The player according to claim 5, wherein the fixing means has a predetermined-shaped portion downwardly protruded from a frame in which the tray can be installed to be ejected/closed, in order that the stopper pin is fixed/released by virtue of the movement of the stopper lever.

9. The player according to claim 5, wherein the disk ejecting device further comprises:

an elastic means for exerting a force on the tray in opposition to the stopper lever for elastically ejecting the tray.

10. The player according to claim 5, wherein the disk ejecting device enables a user to manually eject the tray by moving the stopper lever by inserting an elongated object into an operation hole which is provided at a front surface of the main base.

11. The player according to claim 5, wherein the lead screw has at least two sections having differing outside diameters in accordance with corresponding operation sections of the pickup unit.

12. The player according to claim 11, wherein in the lead screw an ejecting section for ejecting the tray has a larger outside diameter than an outside diameter of a playing section for moving the pickup unit during playing of a disk.

13. An optical disk player comprising:

a tray for holding a disk;

a pickup unit suspended in a read-in area of the optical disk player while a lead screw engages a feed guide at the disk ejecting section of the lead screw for reading the disk;

a motor for turning the lead screw, the lead screw being engaged with the feed guide for translating the pickup unit; and a tray ejecting mechanism, the tray ejecting mechanism allowing ejection of the disk when the feed guide moves from engagement with a disk playing section of the lead screw to engagement with a disk ejecting section of the lead screw.

14. The optical disk player of claim 13, wherein the disk playing section of the lead screw has an outside diameter smaller than an outside diameter of the disk ejecting section.

15. The optical disk player of claim 13, wherein the lead screw translates while engaging the feed guide at the disk ejecting section.

16. The optical disk player of claim 15, wherein during translation of the lead screw, the lead screw engages an ejecting lever of the ejecting mechanism, causing translation of the ejecting lever.

17. The optical disk player of claim 16, further comprising a stopper lever pivotable about a pivot and engageable with the ejecting lever, translation of the ejecting lever causing pivoting of the stopper lever out of engagement with a projection, and allowing the tray to eject.

18. The optical disk player of claim 17, further comprising a spring for exerting an ejecting force on the tray, the spring acting to translate and eject the tray when the stopper lever is pivoted out of engagement with the projection.

19. The optical disk player of claim 13, wherein the tray ejecting mechanism comprises:

an ejecting lever, the ejecting lever being translatable in a direction parallel to the direction of translation of the pickup unit; and a stopper lever pivotable about a pivot point, the stopper lever being engageable with the ejecting lever.

20. The optical disk player of claim 19, wherein the lead screw is translatable in a direction parallel to translation of the pickup unit, and is engageable with the ejecting lever.

21. The optical disk player of claim 20, wherein when the lead screw translates after engagement with the ejecting lever, the ejecting lever engages the stopper lever and causes the stopper lever to pivot out of engagement with a projection, allowing ejection of the tray.

22. The optical disk player of claim 21, wherein the disk playing section of the lead screw has an outside diameter smaller than an outside diameter of the disk ejecting section.

* * * * *